(No Model.)
J. D. HIGGINS.
ANIMAL POKE.
No. 395,392. Patented Jan. 1, 1889.
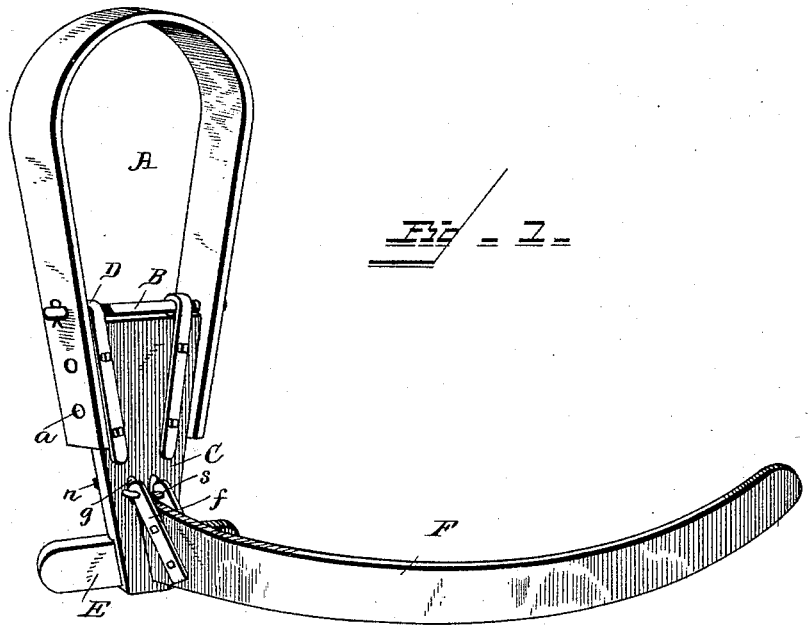
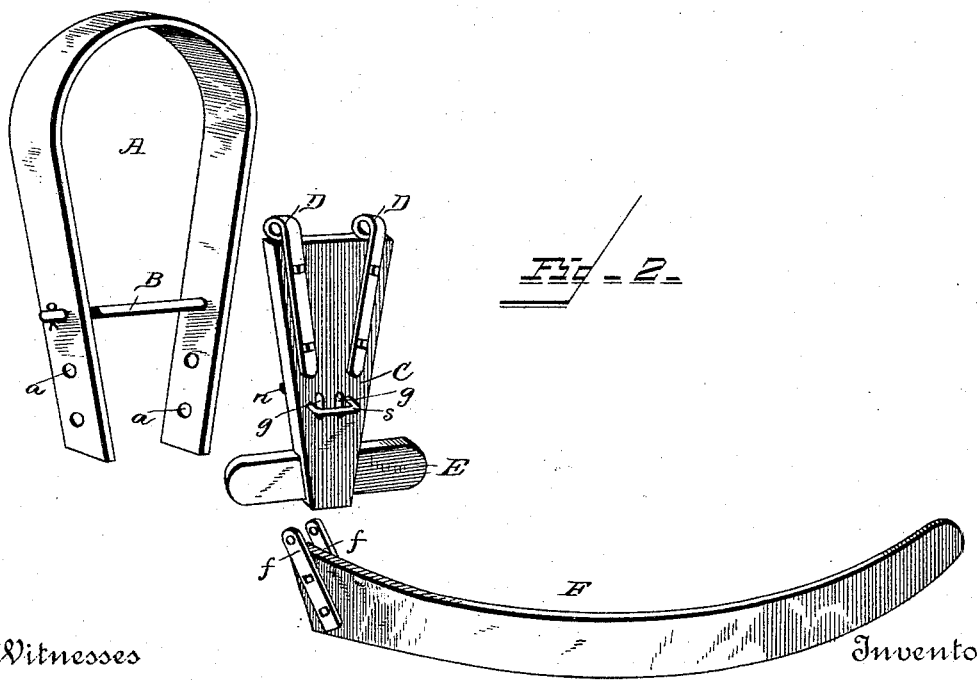
Witnesses
Albert Spidur
Dan A. Grosvenor
Inventor
John D. Higgins.
By his Attorneys
Anderson & Myers

United States Patent Office.

JOHN D. HIGGINS, OF MOUNT LIBERTY, OHIO.

ANIMAL-POKE.

SPECIFICATION forming part of Letters Patent No. 395,392, dated January 1, 1889.

Application filed August 13, 1888. Serial No. 282,629. (No model.)

*To all whom it may concern:*

Be it known that I, JOHN D. HIGGINS, a citizen of the United States of America, residing at Mount Liberty, in the county of Knox and State of Ohio, have invented certain new and useful Improvements in Animal-Pokes, of which the following is a specification, reference being had therein to the accompanying drawings.

My invention relates to animal-pokes; and it consists in certain details of construction and c mbinations of parts, which will first be described in connection with the accompanying drawings, and then clearly pointed out in the claims.

Figure 1 of the drawings is a perspective view of my improved poke. Fig. 2 shows the parts detached.

Referring to the drawings, A represents the yoke, made, preferably, from a flat strip of wood bent to the proper shape, and having a series of holes, $a$, in each side for the reception of a rod, B, higher or lower in it.

C represents the stale-carrier, which is hinged to rod B by means of strap-iron hinges D, as shown. The carrier is of such width and its sides are so inclined that it fits neatly within and conforms to the shape of the yoke, whereby lateral motion is avoided. The stale-carrier is provided at its lower end with a transverse breast-board, E, secured thereto in any suitable manner.

F represents the stale hinged at the upper edge of its inner end to the lower portion of the stale-carrier. A convenient manner of thus hinging the stale is to secure a perforated metallic strip, $f$, on each side of it in such position that the perforations in the strips will come over the upper edge of the inner end, and then pass a staple, $s$, through the perforations in the strips, and also through the stale-carrier, and secure the staple to the carrier by screw-threaded nuts $n$, grooves $g$ being cut in the carrier to permit the free passage of the projecting ends of the hinge-strips $f$ in folding up the stale, all as clearly shown in Fig. 1. The inner end of the stale, which rests against the carrier, is cut diagonally, so as to incline the outer end toward the ground, and the outer portion is curved upward, as shown, in order to prevent the outer end from entering the ground.

With a poke constructed as above described the animal can graze with perfect ease. He cannot throw the stale over the fence, and thereby get against the latter to push it down, for in throwing up his head to do so the carrier will swing backward on rod B, and thereby cause the stale to assume a lower plane. The stale will always be kept properly in front of the animal, for the reason that the carrier has no lateral movement. The stale, being hinged at its upper edge and abutting against the carrier, cannot come into contact with the animal's legs, as the breast-board will prevent backward movement of the carrier, and, finally, by reason of its inner end being cut diagonal and hinged, as above stated, it cannot fall below a given plane relatively to the carrier when in use, but when not in use can be folded up into convenient shape.

Having thus described my invention, what I claim as new, and desire to secure by Letters Patent, is—

1. The combination, with the yoke and a bolt passed therethrough, of a carrier fitting neatly within the yoke, hinged at its upper end on said bolt, and provided at its lower end with a breast-board, and a stale hinged at the upper edge of its inner or rear end to said carrier, the rear end of the stale resting normally against the carrier, substantially as described.

2. The combination, with the yoke and a bolt passed therethrough, of a carrier hinged at its upper end on said bolt and provided at its lower end with a breast-board, and a stale having a diagonally-cut inner end hinged at its upper edge to the said carrier, substantially as described.

3. The combination, with the yoke and a bolt passed through it, of a carrier fitting neatly within the yoke, hinged at its upper end on said bolt, and provided at its lower end with a breast-board, a stale having a diagonally-cut inner or rear end provided at said end on each side with a perforated metallic hinge-strip, the perforations in said strips being above the upper edge of the stale, and a staple passed through the hinge-strips and secured in the carrier, the carrier being grooved to permit the free passage of the projecting ends of said strips in folding up the stale, substantially as described.

In testimony whereof I affix my signature in presence of two witnesses.

JOHN D. HIGGINS.

Witnesses:
D. L. TEAGARDEN,
WM. R. ROWLANDS.